June 12, 1923.
H. A. MYER
1,458,238
TIRE PROTECTOR AND ANTISKIDDING DEVICE
Filed Jan. 8, 1923
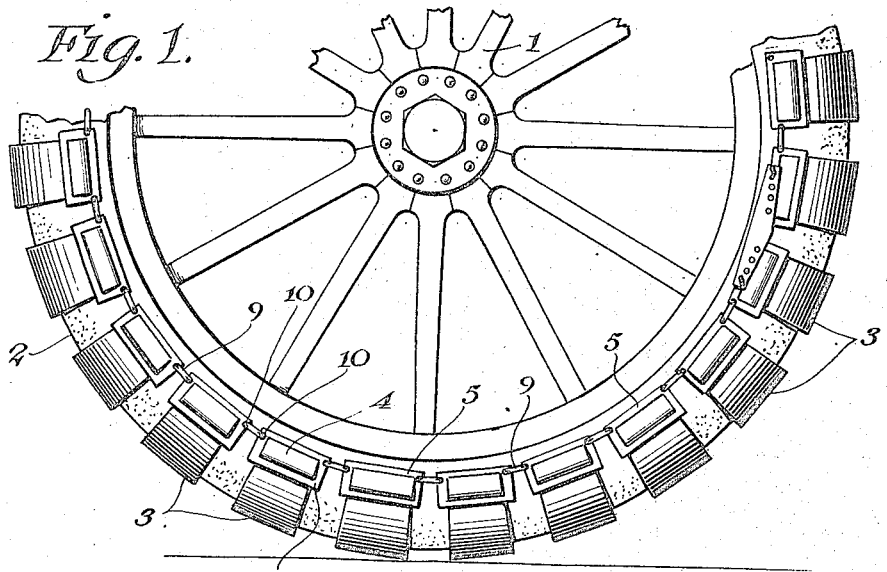
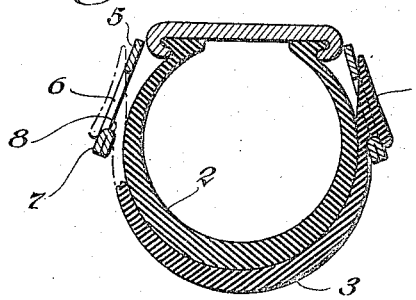
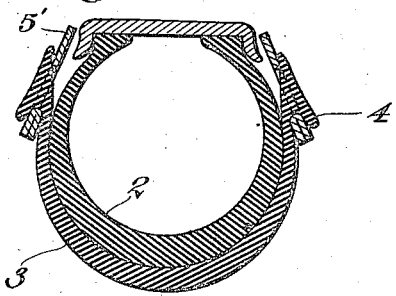
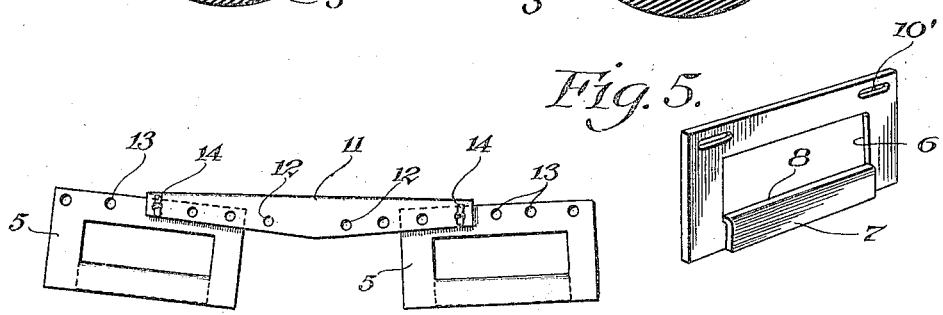
Inventor
HERMAN A. MYER.
By Eccleston & Eccleston.
Attorneys Patented June 12, 1923.

1,458,238

UNITED STATES PATENT OFFICE.

HERMAN A. MYER, OF YAKIMA, WASHINGTON.

TIRE PROTECTOR AND ANTISKIDDING DEVICE.

Application filed January 3, 1923. Serial No. 611,321.

*To all whom it may concern:*

Be it known that I, HERMAN A. MYER, a citizen of the United States, residing at Yakima, in the county of Yakima and State of Washington, have invented certain new and useful Improvements in Tire Protectors and Antiskidding Devices, of which the following is a full, clear, and exact description.

My invention relates to a tire protector and anti-skidding device for automobiles, trucks and the like, and has for its object to provide such a device which may be constructed from worn or partly worn tires. To this end the invention comprises a plurality of transverse sections cut from a discarded tire and united by means of plates and links so that the same may be attached to an automobile wheel.

Apertured plates for receiving the beaded ends of the tire sections have been previously used, but it has been found in practice that the sharp edge of the plate opening or aperture soon mutilates that portion of the section which unites the bead to the tread, thereby permitting the section to be thrown off. It is an object of the present invention to obviate this defect, and to this end I have provided the plate with a protector to guard the tire section against such mutilation.

Other objects and advantages of the invention will be apparent from the following description when taken in connection with the accompanying drawings, in which:

Figure 1 is a side elevation of a portion of an automobile wheel and tire with my anti-skidding device attached.

Figure 2 is a transverse section taken through one of the tire sections shown in Figure 1.

Figure 3 is a side elevation of the means for connecting the free ends of the device when applied to a tire.

Figure 4 is a section through a slightly modified form of plate attached to a tire section, and Figure 5 is a perspective view of a still further modified form of plate.

Referring to the drawing more in detail, the numeral 1 designates the ordinary automobile wheel on which is mounted the tire 2. For the purpose of protecting the tire from wear and tear, and also for the purpose of preventing slipping and skidding of the tire, a plurality of tire sections 3 are disposed circumferentially around the tire 2. These tire sections are formed by cutting up old or discarded tires of the clincher type. Each of the sections, therefore, is provided with a bead 4.

In order to form a united series of these tire sections 3 for application to a tire, I provide the plates 5, which are apertured, as indicated at 6, for the purpose of receiving the ends of the tire sections. In forming the apertures 6 I find it advisable to bend downwardly a portion of the metal cut from the plate, as indicated by the numeral 7, thereby providing a well rounded lower edge 8. It is this edge of the aperture 6 which applies force to the tire sections to hold them in place, and by having the same constructed as shown it is obvious that the objectionable cutting action heretofore developed in tire protectors of this type is reduced to a minimum, if not entirely removed.

The plates 5 of the tire sections are connected by means of links 9, which are passed through circular apertures 10 in the corners of the plates. Such an arrangement of links is liable to snarl, however, and I, therefore, contemplate the use of elongated slots 10' (Figure 5) where found desirable.

In Figure 3 of the drawing is shown a link 11 which is U-shaped in cross section. This link is provided with a series of apertures 12 spaced longitudinally thereof. The end plates of each series of tire sections are also provided with a series of apertures, as indicated at 13, and in securing the appliance to a tire it is only necessary to properly adjust the link 11 with respect to the end plates 5 and insert cotter pins 14 or the like through the registering openings.

As clincher tires are usually found in only the smaller sizes, it is sometimes found that the tire to be protected is of such size that the links 9 will rub against the sides thereof and do considerable damage. To obviate this difficulty I have provided a plate 5' (Figure 4) in which the upper boundary of the aperture 6 is somewhat deeper than that shown in Figures 1, 2, 3 and 5. This construction will permit of the tire sections being formed from the smaller tires and yet so position the connecting links 9 that they will be disposed along the tire rim rather than against the tire itself.

From the foregoing description when taken in connection with the accompanying drawing it will be seen that I have provided an extremely simple and durable arrangement by which old or discarded tires may be employed as protectors and also one in which the tire sections are shielded from premature mutilation.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In a tire protector and anti-skidding device comprising a plurality of tire sections placed in a series around a tire, plates provided with apertures for receiving the beaded portions of the tire sections and securing the latter to a tire, the edge of the aperture which engages under the bead being rounded, each of said plates being further perforated adjacent its ends, and links passing through said last-named perforations for connecting said plates.

2. In a tire protector and anti-skidding device comprising a plurality of tire sections placed in a series around a tire, plates provided with apertures for receiving the beaded portions of the tire sections and securing the latter to a tire, a portion of the plate which is removed to form the aperture being bent downwardly to provide a rounded edge along the side of said aperture which engages under the bead of the tire section.

HERMAN A. MYER.